Figure 1:
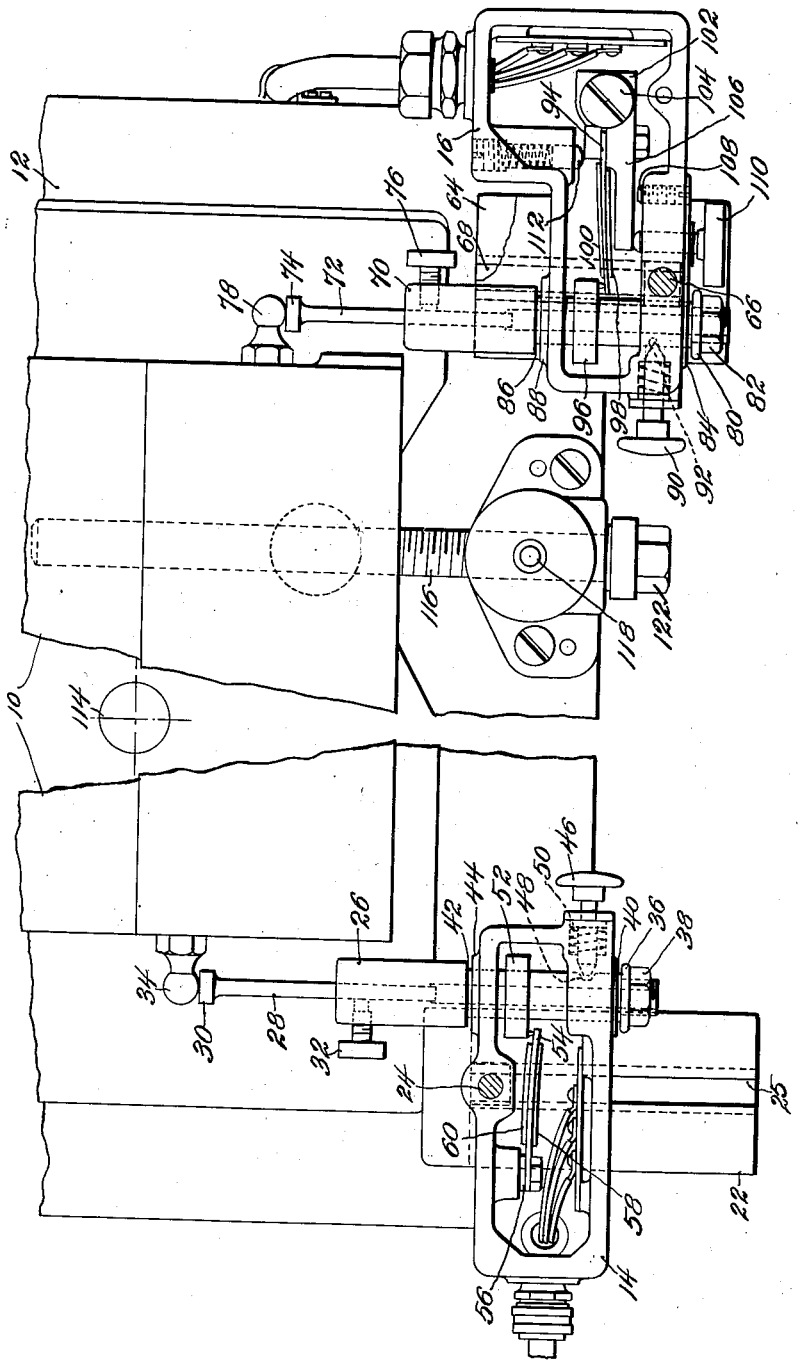

June 17, 1952 G. N. LEVESQUE 2,600,550
TAPER CONTROL INDICATOR
Filed Aug. 7, 1945 3 Sheets-Sheet 1

Witness
Jas. J. Maloney

Inventor
George N. Levesque
by his attorney
Maxwell Fish

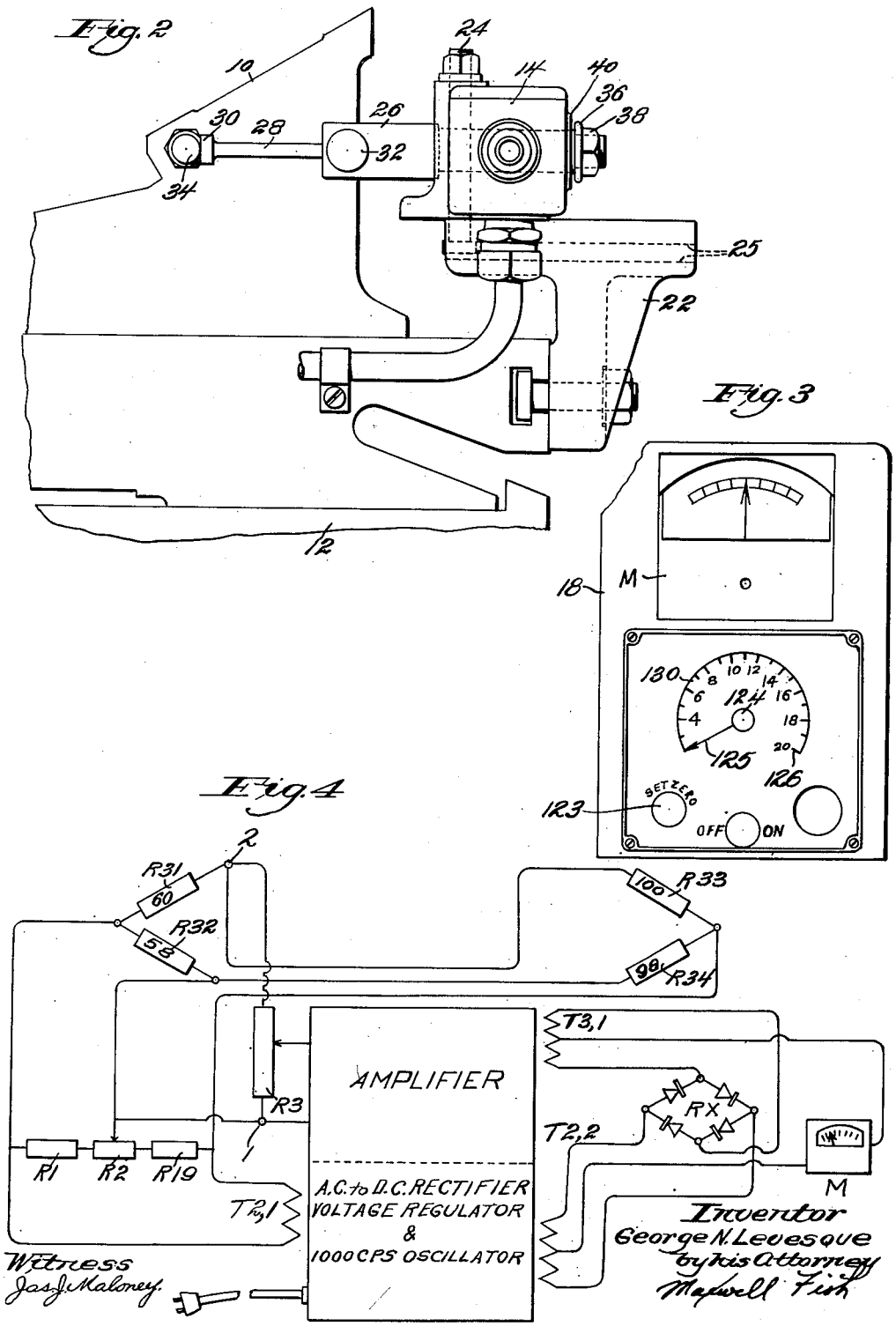

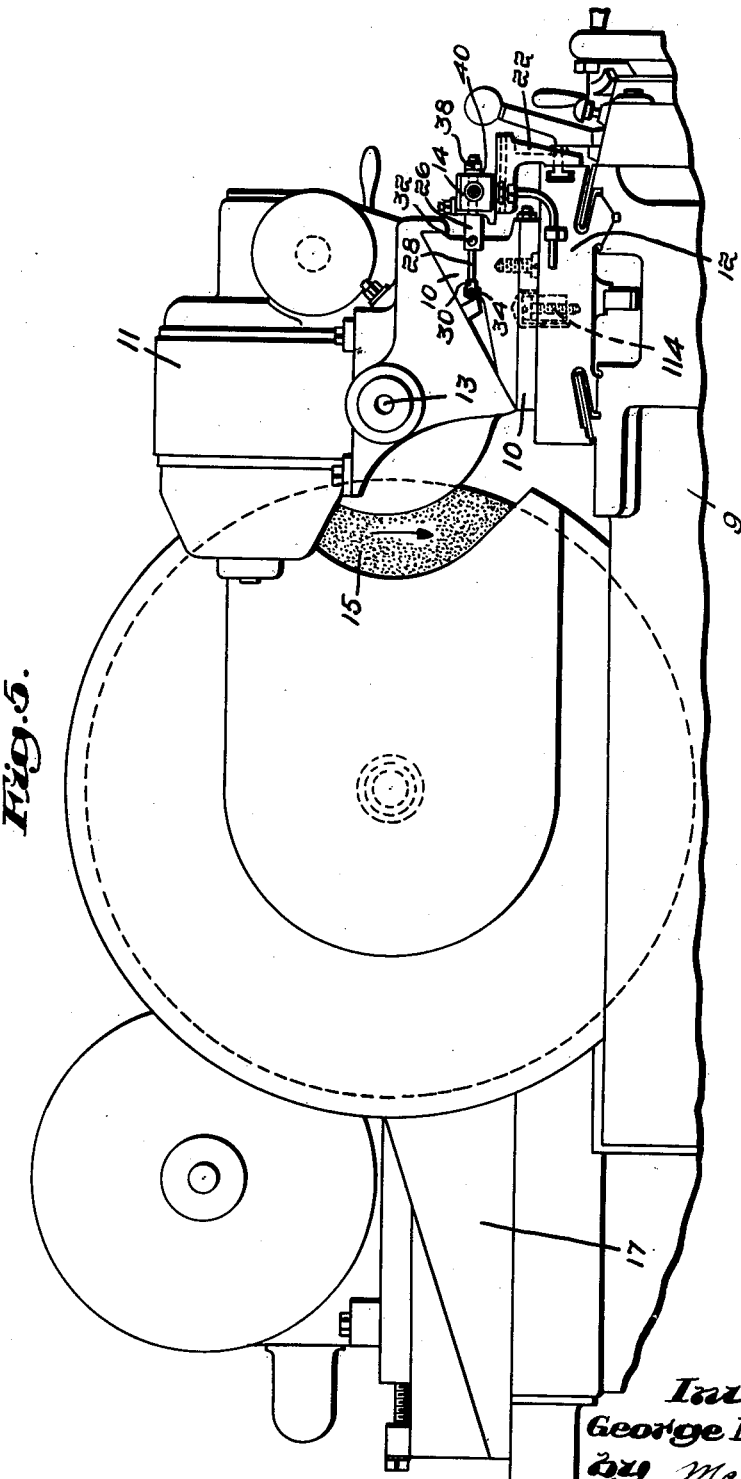

Patented June 17, 1952

2,600,550

UNITED STATES PATENT OFFICE 2,600,550

TAPER CONTROL INDICATOR

George N. Levesque, Cranston, R. I., assignor to Brown and Sharpe Manufacturing Company, a corporation of Rhode Island Application August 7, 1945, Serial No. 609,367

16 Claims. (Cl. 51—165)

The present invention relates to an improved taper control attachment for use with a swivel work support in a machine tool. The invention is herein disclosed in a preferred form as embodied in a cylindrical grinding machine of the general type provided with a swivel table for grinding tapered work.

Where it is required to grind tapered work to close limits as, for example, to the nearest ten-thousandth of an inch, an extremely accurate setting of the swivel support is required. Under conditions of commercial operation, considerable difficulty has been encountered in properly establishing the angular position of the table with the required degree of accuracy. It has been found that the mechanical gauges and scales ordinarily employed for indicating the angular position of the table are not suited for the very fine adjustment here required and such devices have further been found subject to error as a result of deflection and wear of the machine parts including particularly the pivot for the swivel table. It is the usual practice to effect a fine adjustment in the position of the swivel table by means of cut and try methods which involve the frequent measuring of the work by the operator and further require a very high degree of skill.

It is the object of the invention to provide a novel and improved taper control device for the assistance of the operator to effect a setting of the swivel support which is quickly and easily arrived at, which eliminates any necessity for the frequent removal and measuring of the work as it is brought down to size to check inaccuracies, which is further independent of any inaccuracies which may be inherent in the machine, and which is accurate beyond the most exacting limits which may be demanded of work performed on the machine.

In accordance with the invention, an indicator device for registering small angular movements of the swivel table is provided which comprises elements which are directly responsive to movement of portions of the table at opposite sides of the swivel to provide an indication of such movement, means for combining and for amplifying the indications of movement provided by said elements, and visual inspection means adapted and arranged to register the combined and amplified net indication so provided in terms of angular movement of the table and work supported thereon in either direction.

In the preferred form of the invention, electrical indicating, amplifying and visual inspection units are employed. The electrical connections include a group of bonded electrical strain sensitive gauges which are connected to provide a balanced Wheatstone bridge circuit, an amplifier unit which may be of ordinary description including a potentiometer adapted for varying the sensitivity of the device, and a visual inspection meter provided with a zero center scale.

In carrying out the invention, two table contact gauge units are provided, one at each end of the table, each of which comprises an axially movable table contact plunger, and an element capable of being distorted to produce measurable variations of strain therein, said element in the present construction taking the form of a beam arranged to be acted upon at one end by the plunger. Each of the elements or beams referred to has mounted on opposite sides thereof a bonded electrical strain sensitive gauge which serves to detect and register variations of strain produced by any variation in the distortion of the beam.

Further in accordance with the invention, the electrical strain sensitive gauges of the indicator device are arranged in a balanced Wheatstone bridge circuit in such a manner that movement of the work contacting plungers and consequent distortion of the beams associated with the gauge units at both ends of the table will cause a change in the conditions of resistance within the bridge circuit which takes into account both the amount and direction of movement of each end of the table and thus provides a net indication of the angular displacement of the table.

Further in accordance with the invention, the potentiometer referred to is calibrated in such a manner as to vary the amplification of the device in accordance with the length of the work piece to be measured so that the meter reading of the angular change may be expressed correctly in terms of one ten-thousandth of an inch in the length chosen for measurement.

With the above stated and other objects in view as may hereinafter appear, the several features of the invention consist also in the devices, combinations and arrangement of parts hereinafter described and claimed which, together with the advantages to be obtained thereby, will be readily understood by one skilled in the art from the following description taken in connection with the accompanying drawings, in which Fig. 1 is a somewhat fragmentary plan view of the swivel work support of a cylindrical grinding machine with the contact gauge units of applicant's taper control attachment in position at each end thereof, the covers of the units having been removed to show underlying parts; Fig. 2 is an elevation, looking from the left of Fig. 1, illustrating particularly the arrangement of the gauge unit at the left-hand end of the swivel table; Fig. 3 is a view in front elevation of the amplifying unit and meter provided with the attachment; Fig. 4 is a diagram of the electrical connections embodied in applicant's taper control attachment; and Fig. 5 is a somewhat fragmentary view in left side elevation of a cylindrical grinding machine, indicating generally the work and grinding wheel supporting assemblies and a portion of the machine base.

Referring to the drawings, in Figs. 1 and 2 there are shown a swivel table 10 and a longitudinally reciprocable table support 12 for a cylindrical grinding machine having a base generally designated at 9 in Fig. 5. The swivel support shown is of a conventional type arranged to have mounted thereon a head stock 11 and foot stock 13 of ordinary description for supporting and for rotating cylindrical work on centers for grinding. The grinding wheel 15 and grinding wheel carriage 17, with relation to which the swivel support 10 and reciprocable support 12 are moved, are shown only in outline, as these parts may be of a conventional type, and form specifically no part of the invention. For a more complete description and illustration of a machine of the general type to which the present invention is applied, reference may be had to the United States patent to Mathewson et al., Pat. No. 2,165,898, patented July 11, 1939, for a Grinding Machine.

The taper control device for determining the correct angular position of the swivel table and work piece mounted thereon which forms the subject-matter of the invention comprises generally two table gauge units 14 and 16 located at the left-hand and right-hand ends, respectively, of the swivel table 10, and an electrical amplifier unit 18 which houses the several electrical devices of the taper control device including a visual inspection meter having a zero center position, and a potentiometer and adjustable rheostat associated with the Wheatstone bridge circuit for controlling respectively the sensitivity and zero position of the pointer of the visual inspection meter. These electrical connections will be hereinafter more fully described.

As shown in Figs. 1 and 2, the table contact gauge unit takes the form of a housing 14 which is mounted for adjustment transversely across the end of the table 12 on a guideway formed on a bracket 22 carried by the work table 12. The unit is rigidly secured in position on the bracket by engagement of the enlarged head of a clamping screw 24 carried by the unit 14 in a T-shaped slot 25 formed in the bracket 22. The unit housing 14 provides support for a laterally extending table contacting plunger in the form of a sleeve member 26 which is slidably mounted in a journal formed in the housing. An axial bore extending through the sleeve member is adapted to receive a plunger 28 which is provided at its outer end with an enlarged flattened contact head 30. A manually operable clamping screw 32 screw-threaded into the side of the sleeve member 26 is arranged to engage against and to clamp the plunger 28 in an adjusted position longitudinally of the sleeve member 26. When the device is in operating position, the contact surface 30 of the plunger 28 engages against a cooperating spherical contact element 34 at the left-hand end of the swivel support 10. The sleeve member 26 passes entirely through the housing and is formed at its rear end with a reduced portion to receive a collar 36 and nut 38, these parts being arranged for engagement against a boss 40 on the housing 14 to limit the projecting movement of the sleeve member 26. Movement of the sleeve member in the opposite direction is limited by engagement of a shoulder 42 formed on the sleeve member with a boss 44 on the opposite side of the housing 14. It is contemplated that the work contacting plunger of the gauge unit comprising the sleeve member 26 and plunger 28 will have a range of movement approximately twenty thousandths of an inch. In order that the contact element may be supported in intermediate position for purposes of adjustment in setting up the gauge, a centering pin 46 is provided having at its inner end a V-shaped tip for engagement with a corresponding V-shaped notch 48 in the sleeve member 26. A compression spring 50 coiled about the centering pin and seated at one end against the base of an enlarged portion of the pin receiving bore and at its other end against a collar secured to the pin, acts normally to maintain the centering pin 46 in a retracted inoperative position. Inward pressure exerted by the operator upon the centering pin causes the pin to be seated in the notch 48 to center the sleeve member 26 in an intermediate position.

Movement of the table contacting plunger comprising the sleeve member 26 is adapted to vary the amount of distortion imparted to a beam in order to produce measurable variations of strain therein. As best shown in Fig. 1, the sleeve member 26 has secured thereon a collar 52 which is arranged to bear against the free end of a beam 54 rigidly secured at its other end by means of a stud 56 to a boss on the gauge unit housing 14. The beam 54 takes the form of a flat spring-like plate which provides support for two bonded electrical strain sensitive gauges 58 and 60, the gauge 58 being secured to the rear side of the beam 54 and the gauge 60 being secured to the front side. Any variation of distortion of the beam 54 produced by linear movement of the table contacting plunger 26 provides through the strain sensitive gauges an indication of the extent and direction of linear movement of the contacting portion of the swivel table.

The table contact gauge unit 16 mounted at the right-hand end of the table 12 and swivel table 10 is similar in many respects to the unit 14 previously described and comprises a housing mounted for adjustment transversely of the table 12 on a guideway formed on a bracket 64 carried by the work table 12. The unit is rigidly secured in position on the bracket by engagement of an enlarged head of a clamping screw 66 carried by the unit 16 in a T-shaped slot 68 formed in the bracket 64. The unit housing 16 provides support for a laterally extending table contacting plunger in the form of a sleeve member 70 slidably mounted in the housing 16. An axial bore extending through the sleeve member is adapted to receive a plunger 72 which is provided at its outer end with an enlarged flattened contact head 74. A manually operable clamping screw 76 screw-threaded into the side of the sleeve member 70 is arranged to engage against and to clamp the plunger 72 in an adjusted position longitudinally of the sleeve member 70. When set up for operation, the housing 16 is adjusted on its bracket and the plunger 72 is sufficiently extended so that the flattened contact head 74 engages against a cooperating spherical contact element 78 at the right-hand end of the swivel support 10. The sleeve member 70 passes entirely through the housing and is formed at its rear end with a reduced portion to receive a collar 80 and nut 82, these parts being arranged for engagement against a boss 84 on the housing 16 to limit the projecting movement of the sleeve member 70. Movement of the sleeve member in the opposite direction is limited by engagement of a shoulder 86 formed on the sleeve member with a boss 88 on the opposite side of the housing 16. It is contemplated that the contact plunger of the gauge unit comprising the sleeve member 70 and plunger 72 will have a range of movement approximating twenty thousandths of an inch. A centering pin 90 extending radially of the sleeve member 70 in the housing and having at its inner end a V-shaped tip for engagement with a corresponding V-shaped notch 92 in the sleeve member 70 provides a convenient means for moving the work contacting plunger to a position intermediate its limits of movement. The construction and arrangement of the centering pin 90 is similar to that of the centering pin 46 previously described in connection with the gauge unit 14, being spring-pressed outwardly to a normally inoperative position and adapted to be forced inwardly by manual pressure when desired to move the table contacting plunger to its intermediate position.

The table contacting plunger comprising a sleeve member 70 is operatively connected to a distortable element capable of having measurable strains imparted thereto in the form of a beam 94 which takes the form of a flat spring-like plate. The beam 94 is rigidly supported at one end within the housing 16 and at its other end is arranged to bear against a collar 96 on the sleeve member 70. Two bonded electrical strain sensitive gauges 98 and 100 are mounted on the beam 94, one gauge 98 being mounted on the front side of the beam and the gauge 100 being mounted on the rear side thereof. With this construction and arrangement of the table gauge unit 16, the change of electrical resistance in the strain gauges 98, 100 caused by the variable distortion of beam 94 as the table contacting plunger 70 is moved forward or back, provides an indication of the extent and direction of movement of the right-hand end of the table.

The beam 94 associated with the right-hand table gauge unit 16 is adjustably supported to permit a slight adjustment in the distortion of the beam independently of any movement of the table contacting plunger comprising sleeve member 70 and plunger 72. To this end, the beam 94 is rigidly secured to a sleeve member 102 which is in turn secured to a pivot pin 104. Also formed on the sleeve member 102 is a leftwardly extending arm 106 which is arranged to be engaged by one or the other of two stop screws which include a limit stop screw 108 and a manually operable adjusting stop screw 110. The arrangement of these parts is such that the distortion imparted to the beam 94 acts to maintain the arm 106 in contact with these screws. Also urging the bracket 102 and arm 106 against stop screws 108 and 110 is a spring-pressed plunger 112 which is seated in a bore formed in the housing 16 and is arranged for engagement with an abutment on the opposite side of the sleeve member 102 and arm 106. By manual adjustment of the screw stop 110, a limited adjustment of the amount of distortion of the beam 94 may be effected between limits provided by the limit stop screw 108 and by a limitation of the inward movement of the adjustable stop screw 110 as the enlarged end thereof moves into engagement with a boss on the housing 16. This adjustment may be employed by the operator, for example, to test the extent of the magnification of the device or if so desired, or to bring the pointer on the visual inspection meter to a precise zero position. For use in checking the magnification of the electrical amplifier unit, the limit screw 108 is set so that movement of the arm 106 from one to the other limit will effect a movement of the pointer equivalent to an exactly predetermined movement of the table contacting plunger comprising the sleeve member 70 and plunger 72. If, when this operation is performed, the pointer moves over a greater or lesser than the prescribed number of divisions, the error is easily corrected by adjustment in the electrical magnification of the amplifying unit.

The pivotal support or swivel for the swivel table 10 is indicated generally at 114 in Fig. 1. The mechanism for adjusting the angular position of the table about the swivel 114, which is of ordinary description, is also generally shown in Fig. 1 and comprises an adjusting screw 116 which is mounted for rotational movement in a swivel bearing 118 carried on the longitudinally movable table 12. The adjusting screw 116 is screw-threaded to a swivel nut generally indicated at 120 and mounted in the swivel table 10. Rotation of the screw 116 may be readily effected by the use of a wrench which is applied to the hexagonal head 122 formed on the end of the adjusting screw 116.

In the preferred form of the invention herein particularly described and illustrated, an electrical control and amplifier system is employed for registering the indication of movement of the left-hand and right-hand ends of the swivel table provided by the operation of the left-hand and right-hand table contact gauge units above described, for combining these indications in such a manner as to provide a net indication of the turning movement or angular displacement of the swivel table, and for amplifying and for registering on the dial of a meter for visual inspection the net indication thus produced. The electrical system referred to includes the four bonded electrical strain sensitive gauges 58, 60, 98 and 100 above described which, as clearly shown in the electrical diagram, Fig. 4, are arranged to form a balanced Wheatstone bridge circuit. Inasmuch as electrical strain sensitive gauges including amplifying electrical circuits for the same are well-known, it is believed unnecessary to describe these devices in detail, except to point out that a gauge of this general description comprises a finely drawn wire which is bonded throughout its effective length in a suitable form of cementing agent, and the gauge is then similarly secured or bonded to the surface of the strained element.

The electrical control and amplifier circuit provided for use with applicant's taper control indicator device is illustrated in somewhat diagrammatic form in Fig. 4 of the drawings. Since certain of the electrical devices employed and certain portions of the electrical circuit in which these devices are embodied are well-known in the art and form specifically no part of the present invention, only such description is included herewith as is believed necessary to enable one skilled in the art to understand the connection of the present invention therewith. As shown in Fig. 4, the two electrical strain sensitive gauges 58, 60 embodied in the left-hand table contact gauge unit 14 and the two electrical strain sensitive gauges 98, 100 incorporated in the right-hand table contact gauge unit 16 are connected to form a Wheatstone bridge balanced circuit. Current is supplied to the strain gauge Wheatstone bridge circuit from an A. C. supply through a conventional rectifier circuit which serves to supply a filtered direct current voltage. Part of the D. C. current is regulated by a gaseous regulator tube which, being a piece of ordinary equipment, is not shown, to supply a 1000 cycles-per-second triode oscillator and the last amplifier tube of the amplifier circuit which is again of ordinary description. The 1000 cycles-per-second oscillator supplies the Wheatstone bridge through secondary T2,1 of the oscillator transformer, and also the rectifier RX through secondary T2,2 of the same oscillator transformer. Forming part of the Wheatstone bridge circuit are two resisters R1 and R19 which, together with the potentiometer R2, afford a means for electrically adjusting the unbalance of the strain gauge bridge circuit. This adjustment may be employed through the agency of a manual control knob 123 (Fig. 3) to secure a zero setting of the pointer for the visual inspection meter generally indicated at M in Figs. 3 and 4. Any unbalance voltage appearing across two of the points designated at 1 and 2, respectively, is fed to the potentiometer R3 which, by means of a conventional manually operable knob 124, pointer 125, and graduated scale 126 on the front of the amplifier unit shown in Fig. 3, is used to vary the sensitivity of the device. Any desired fraction of the unbalance voltage appearing at points 1 and 2 is selected and impressed on the grid of the first amplifier tube of the amplifier. The unbalance voltage is amplified and appears in the secondary T3,1 of the output transformer associated with the last amplifier tube. The output current is rectified by the circuit consisting of the ring connected copper oxide rectifier RX, and the transformer windings T3,1 and T2,2. A current flows through the visual inspection meter M provided with the amplifier unit, this current being proportional to the strength of the output voltage, hence to the degree of strain gauge Wheatstone bridge unbalance, and in a direction determined by the relative phase relations between the voltage in the transformer winding T2,2 and the voltage in the transformer winding T3,1 which is in turn determined by the direction of the strain gauge Wheatstone bridge unbalance.

In accordance with the invention, the Wheatstone bridge circuit referred to is so arranged as to provide a net indication of the movements of the two ends of the table, and for this purpose is so arranged that the indication provided by the variable distortion of the beam in the table contact gauge unit at one end of the table is contrasted with or subtracted from the indication produced by the variable distortion of the beam in the table contact gauge unit at the opposite end of the table. From an inspection of Figs. 1 and 4 of the drawings, it will be noted that gauges 58 and 60 are respectively in the front and rear positions on beam 54 associated with the left-hand unit and gauges 98 and 100 occupy respectively front and rear positions on the beam 94 associated with the right-hand unit. If the swivel table 10 is now assumed to pivot with the right-hand end moving toward the rear of the machine or away from the operator and with the left-hand end moving toward the operator, the beams or plates on which the strain gauges are mounted will bend in opposite directions. Under these conditions, the two gauges 60 and 98 would record like strains which, in this instance, are strains due to the increase of tension on the surfaces of the beams to which the gauges are attached. Correspondingly, gauges 58 and 100 would record like strains which, in this instance, are strains of compression as the surfaces of the beams to which these gauges are attached are contracted. Set up in this manner, the Wheatstone bridge circuit operates to provide an accurate indication of the net angular displacement or movement of the swivel table and this result is reached by measuring the distance actually moved by the two contacting portions of the table at opposite sides of the table pivot. With this arrangement, it will be readily evident that the indication arrived at of angular movement of the table is entirely independent of mechanical or other errors of the mechanism of the machine which might result, for example, from looseness of wear in the swivel mounting for the table.

Further in accordance with the invention, the adjustment for sensitivity of the device provided by the potentiometer R3 is employed to cause the pointer M to give a direct indication of the angular movement in convenient units as, for example, in ten thousandths of an inch in the length of work to be measured, that is, the length of work piece placed on meter. To this end, the potentiometer is adjusted in accordance with the ratio of the length of work to be measured to the full length of the table so that a direct reading may be obtained on the meter M in terms of convenient units, as ten thousandths of an inch of change in diameter of the work piece in its length. For convenience of manipulation, the potentiometer dial designated at 130 in Fig. 3 is scaled in accordance with the number of inches of length of the work piece to be measured so that the indication provided by movement of the meter pointer one division on scale 126 will, for that length of work, represent an angular displacement of the swivel support so that the difference in diameter between the ends of the piece will be changed one ten-thousandth.

For use in connection with the taper grinding of cylindrical work, the several electrical devices above described are adjusted and set up in accordance with a formula, $$2(A-B)\frac{L}{l}$$

in which A represents the change in position of the right-hand end of the swivel table, B represents the change in position of the left-hand end of the swivel table, $l$ represents the distance between actual points of contact of the gauge units 14 and 16 with the swivel table, that is, the effective length of the table, L represents the length of work set on meter, that is, the length of the taper which is to be calipered and ground, and the number "2" is a multiplication factor necessitated by the fact that the caliper measurement of error of the ground work piece is a measurement of diameter and this is exactly twice the distance through which the corresponding portion of the work piece on its line of centers and the table 10 must be moved angularly to effect the angular correction in the position of the table and work piece. The operation of the taper control indicator of the preferred form of the present invention is such as to automatically integrate and to record in a meter reading the several factors of this formula, so that a direct reading of the extent of the angular movement of the surface of the tapered work piece produced by movement of the table 10 is obtained in convenient units, preferably in ten-thousandths of an inch.

The several parts of the electrical control and amplifier system are represented by the several expressions in the formula as follows: the expression "A—B" expresses the operation of the Wheatstone bridge circuit whereby the indication obtained at one end of the table is integrated with respect to or subtracted from the indication obtained at the other end of the table. The expression $$\frac{L}{l}$$

which is a statement of the ratio of the length of the work on meter to the length of the table is expressed in the manual adjustment of the pointer 125 of the potentiometer R3 which, as above noted, is calibrated to be read directly in terms of inches of length of the work piece placed on meter.

The taper control indicator for a swivel support above described has been found to be of particular advantage in that it provides an extremely accurate and continuous indication of the angular position of the swivel support and rotating work piece mounted thereon. Thus, the operator is notified instantly of any change of position of the table, however small, which may take place after the table has been set in the correct position for finish grinding. Such changes are of frequent occurrence and may be caused, for example, by the gradual or delayed release of friction stresses set up when the swivel support is rotated, or as a result of the vibration and stresses incidental to grinding. The use of a visual inspection meter arranged to provide a continuous and accurate indication of the angular position of the swivel support has been found to be of particular value further in that it eliminates the necessity for frequent calipering of the work piece as it is ground to size, and thus makes possible a substantially increased production on the machine and with marked improvement in the quality of the work produced thereon.

While the invention has been herein disclosed in a preferred form as embodied in a taper control indicator in which a group of electrical bonded strain sensitive gauges is employed to detect and to provide indication of net angular movement of a swivel support, together with an electrical control and amplifier system for registering such indication for visual inspection, it will be understood that the invention in its broader aspects is not limited to the specific embodiment shown, and that in accordance with the teaching of the invention, any means other than the electrical devices shown may be employed to secure simultaneous indications of linear movement of both ends of the table and to combine said indications into a net indication which will continuously express in convenient units of linear measurement the present position and extent of angular displacement of the swivel support and work piece mounted thereon.

It will be understood further that the expression "taper control" as used in this specification, is intended to include the removal of any existing taper from a work piece.

Certain novel features embodied in the illustrated construction which relate particularly to the construction and arrangement of the gauging unit including the strained element and bonded electrical strain sensitive gauges mounted thereon for indicating movement of a gauging element, forms the subject-matter of applicant's copending application for Letters Patent in the United States Patent Office, Serial No. 608,153, filed August 1, 1945, issued as Patent No. 2,581,264, dated January 1, 1952, for Gauges.

The invention having been described, what is claimed is:

1. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises elements directly responsive to movement of portions of the swivel support spaced from one another along the swivel support with relation to similarly spaced opposite portions of the primary support to provide an indication of such movement with relation to said opposite portions, and means for combining said indications to provide a net indication of angular displacement of the swivel support with relation to the primary support.

2. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises elements directly responsive to movement of portions of the swivel support spaced from one another along the swivel support with relation to opposite portions of the primary support to provide an indication of such movement, means for combining said indications to provide a net indication of angular displacement of the swivel support with relation to the primary support, and visual inspection means responsive to said net indication.

3. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises elements directly responsive to movement of portions of the swivel support spaced from one another along the swivel support with relation to opposite portions of the primary support to provide an indication of such movement, means for combining said indications to provide a net indication of angular displacement of the swivel support with relation to the primary support, means for amplifying said net indication of angular displacement of the swivel support, and visual inspection means to register said amplified net indication of angular displacement of the swivel support.

4. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises elements directly responsive to movement of portions of the swivel support spaced from one another along the swivel support with relation to opposite portions of the primary support to provide an indication of such movement, means for combining said indications to provide a net indication of angular displacement of the swivel support with relation to the primary support, means for amplifying said net indication of angular displacement of the swivel support, visual inspection means to register said amplified net indication of angular displacement of the swivel support, and means under the control of the operator to vary the degree of said amplification in accordance with the length of work piece to be measured whereby the net indication registered by said visual inspection means corresponds to the extent of angular movement of the work piece over its length.

5. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises elements continuously responsive to changes in position of portions of the swivel support spaced from one another along the length of the swivel support with relation to opposite portions of the primary support to provide a continuous indication of such movement, means to transmit and to combine said indications to provide a continuous net indication of angular displacements of the swivel support, and visual inspection means continuously responsive to said net indication.

6. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises a pair of support movement gauge units located in spaced relation along the length of the swivel support, each comprising an element responsive to movement of an adjacent portion of said swivel support with relation to an opposite portion of the primary support and an electrical resistance capable of being varied in accordance with the response of said element, and electrical indicating and amplifying means for providing a net indication of angular movement of the swivel support with relation to the primary support comprising a balanced Wheatstone bridge circuit incorporating said variable electrical resistances arranged to produce an unbalance current as a net indication of angular movement of the swivel support.

7. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises a pair of support movement gauge units located in spaced relation along the length of the swivel support, each comprising an element responsive to movement of an adjacent portion of said swivel support with relation to an opposite portion of the primary support and an electrical resistance capable of being varied in accordance with the response of said element, electrical indicating and amplifying means for providing a net indication of angular movement of the swivel support comprising a balanced Wheatstone bridge circuit incorporating said variable electrical resistances arranged to produce an unbalance current as a net indication of angular movement of the swivel support, amplifying means for said current, and a meter responsive to both direction and strength of the amplified current to provide a visual net indication of said angular movement of the swivel support.

8. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises a pair of support gauge units located in spaced relation along the swivel support, each comprising an element carried on one of said supports responsive to movement of an opposite portion of the other of said supports and an element capable of being distorted to produce measurable variations of strain therein arranged to be acted upon by said element, and electrical indicating and amplifying means for providing net indication of angular movement of the swivel support comprising bonded electrical strain sensitive gauges on each of said distortable elements and a balanced Wheatstone bridge circuit incorporating said strain gauges arranged to produce an unbalance current as net indication of angular movement of the swivel support, amplifying means for said current, and visual inspection means responsive to both direction and strength of the amplified current to provide a net indication of said angular movement of the swivel support.

9. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises a pair of swivel support movement contact gauge units located in spaced relation along the swivel support each comprising a movable contacting member carried on one of said supports, an element carried on an opposite portion of the other of said supports capable of being distorted to produce measurable variations of strain therein connected to be acted upon by said contacting member, and electrical indicating and amplifying means for providing net indication of angular movement of the swivel support comprising a pair of bonded electrical strain sensitive gauges mounted on opposite sides of each of said distortable elements, a balanced Wheatstone bridge circuit incorporating said strain gauges arranged to produce an unbalance current as a net indication of angular movement of the swivel support, a potentiometer through which said unbalance current passes for adjusting sensitivity of the indicator, amplifying means for said current, and a meter responsive to both direction and strength of the amplified current to provide a visual net indication of said angular movement of the swivel support.

10. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises means responsive to movement of portions spaced along the swivel support for providing indications of movement of each said portion with relation to the primary support, means for combining said indications of movement to secure a net indication of angular movement of the swivel support, means for modifying said net indication in accordance with the ratio of the length of work piece on meter to the length of support included between said portions of the swivel support to provide a net indication of a unit change in the difference of size of the work piece in said length of work piece on meter, and visual inspection means for registering said modified net indication in terms of said units.

11. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel support on said primary support, and a taper control indicator for effecting an angular setting of the swivel support with relation to said primary support which is independent of said swivel mounting and comprises a pair of support movement gauge units responsive to movement of different portions of the swivel support removed from the swivel mounting, each comprising an element carried on one of said supports responsive to movement of an opposite portion of the other of said supports and an electrical resistance capable of being varied in accordance with the response of said element, and electrical indicating and amplifying means for providing a net indication of angular movement of the swivel support comprising a balanced Wheatstone bridge circuit incorporating said variable electrical resistances arranged to produce an unbalance current, amplifying means for said current including a potentiometer, and a meter responsive to both the direction and strength of the amplified current wherein the Wheatstone bridge, the potentiometer and the meter are adjusted in accordance with the formula $$2(A-B)\frac{L}{l}$$

in which A represents the change of position of one said portion of the swivel support, B represents the change of position of the other said portion of the swivel support, $l$ represents the distance between said portions of the swivel support, and L represents the length of work set on meter.

12. In a machine tool in which the tool and work piece are supported for relative movements including translatory movement for the performance of an operation upon the work piece, the combination of a work support assembly including a primary support movable to effect said relative translatory movement, a swivel work support, a swivel mounting for the swivel work support on said primary support, a taper control indicator for effecting an angular setting of the swivel work support with relation to said primary support which comprises a pair of support movement gauge units located in spaced relation along the length of the swivel work support each comprising a housing on the primary support, a gauging member having a flat engaging surface movable on the housing and a cooperating rounded contact surface on an adjacent portion of the swivel work support for moving the gauging member therewith, a separate element in each housing giving an individual response to movement of the associated member, means to provide an indication of the movement of each of said members, and means for combining said indications to provide a net indication for angular displacement of the swivel work support with relation to the primary support.

13. In a machine tool in which the tool and work piece are supported for relative movements including translatory movement for the performance of an operation upon the work piece, the combination of a work support assembly including a primary support movable to effect said relative translatory movement, a swivel work support, a swivel mounting for the swivel work support on said primary support, a taper control indicator for effecting an angular setting of the swivel work support with relation to said primary support which comprises a pair of support movement gauge units located in spaced relation along the length of the swivel work support each comprising a housing carried on the primary support, means for adjusting the position of the housing on the primary support substantially in the direction of movement and substantially in accordance with the angular position of an adjacent portion of the swivel work support, gauging members carried by each housing and a cooperating contact surface on said adjacent portion of the swivel work support for effecting movement of the gauging member therewith, elements in each of said housings directly responsive to movement of the cooperating gauging member in the housing, and means to detect, transfer and combine in a net indication the response of said elements in terms of angular displacement of the swivel work support with relation to the primary support.

14. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel work support on said primary support, a taper control indicator for effecting an angular setting of the swivel work support with relation to said primary support which is independent of said swivel mounting and comprises a pair of support movement gauge units located in spaced relation along the length of the swivel work support each comprising a stationary housing, means for effecting a rough adjustment in the position of each housing with relation to the primary support substantially in the direction of movement of an adjacent portion of the swivel work support, gauging members carried by each housing and cooperating contact elements on said adjacent portions of the swivel work support for effecting movement of the gauging members therewith, elements in each housing responsive to movement of the cooperating gauging members and electrical devices to detect, transfer and combine in a net indication response of said elements in terms of angular displacement of the swivel work support with relation to the primary support, and visual means to record said net indication.

15. In a cylindrical grinding machine having a grinding wheel and cylindrical work supporting means arranged for relative rotational and translatory movements for grinding tapered cylindrical work pieces, the combination of a base, a grinding wheel support and a primary work support arranged for relative translatory and depth feeding movements on the base, a swivel support having centers for rotatably supporting a cylindrical work piece, and a device for controlling the angular relation of the swivel support to the primary support including a swivel mounting for the swivel work support on said primary support, and a taper control indicator for effecting an angular setting of the swivel work support with relation to said primary support which is independent of said swivel mounting and comprises a pair of support movement gauge units located in spaced relation along the swivel work support, each comprising a housing mounted on the primary support, members supported in each of said housings for movement with a portion of the swivel work support adjacent to the housing, elements in each of said housings capable of being distorted to produce measureable variations of strain therein connected to be acted upon by the associated member, electrical indicating and amplifying means for providing a net indication of angular movement of the swivel work support comprising bonded electrical strain sensitive gauges mounted on said distortable elements, a balanced Wheatstone bridge circuit incorporating said strain gauges arranged to produce an unbalanced current as net indication of angular movement of the swivel work support, amplifying means for said current, visual inspection means responsive to both direction and strength of the amplified current to provide a net indication of said angular movement of the swivel work support, and means for varying the position of one of said strained elements with relation to the associated member for adjusting said Wheatstone bridge circuit.

16. In a machine tool in which the tool and work piece are supported for relative movements including translatory movement for the performcombination of a work support assembly including a primary support movable to effect said relative translatory movement, a swivel work support, a swivel mounting for the swivel work support on said primary support, a taper control indicator for effecting an angular setting of the swivel work support with relation to said primary support which is independent of said swivel mounting and comprises elements carried on the primary support directly responsive to movement of portions of the swivel work support spaced from one another along the swivel work support to provide an indication of the movement of each of said portions, and means for combining said indications to provide a net indication of angular displacement of swivel work support with relation to the primary support.

GEORGE N. LEVESQUE.

REFERENCES CITED

The following references are of record in the file of this patent:

UNITED STATES PATENTS

| Number | Name | Date |
|---|---|---|
| 1,632,076 | Hubbard | June 14, 1927 |
| 1,989,037 | Brown | Jan. 22, 1935 |
| 1,994,256 | Simmons | Mar. 12, 1935 |
| 2,011,931 | Dreyer | Aug. 20, 1935 |
| 2,016,420 | Engst | Oct. 8, 1935 |
| 2,065,951 | Terry | Dec. 29, 1936 |
| 2,244,643 | Flygare | June 3, 1941 |
| 2,316,975 | Ruge | Apr. 20, 1943 |
| 2,322,319 | Ruge | June 22, 1943 |
| 2,445,455 | Rights | July 20, 1948 |

FOREIGN PATENTS

| Number | Country | Date |
|---|---|---|
| 630,173 | Germany | May 22, 1936 |